Nov. 13, 1956 W. D. HUSTON 2,770,247
INSTRUMENTS
Filed Sept. 15, 1954 6 Sheets-Sheet 1

INVENTOR
WILLIAM D. HUSTON
BY
Pollard Johnston Smythe & Robertson
ATTORNEYS

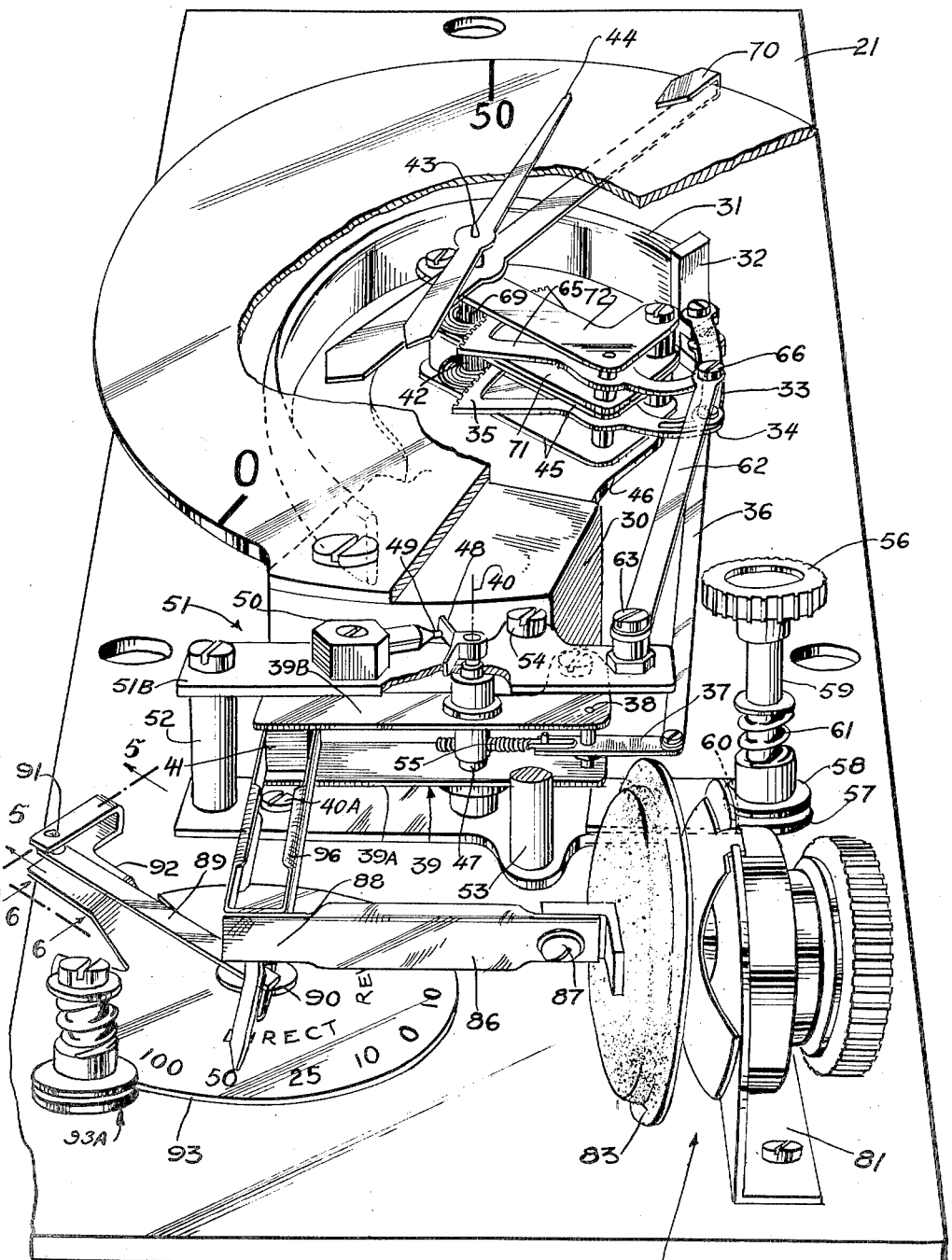

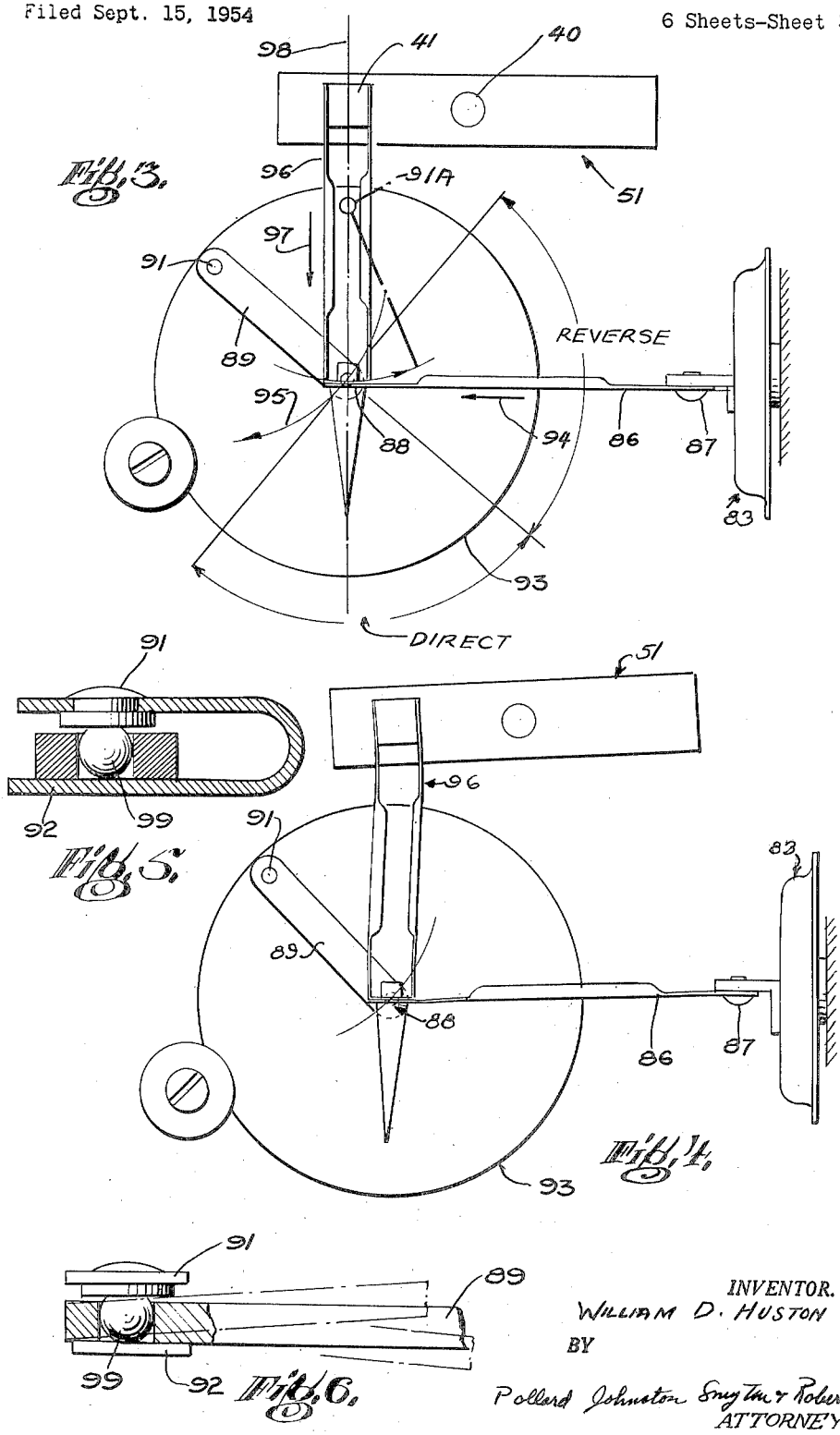

Nov. 13, 1956  W. D. HUSTON  2,770,247
INSTRUMENTS

Filed Sept. 15, 1954  6 Sheets-Sheet 4

INVENTOR
WILLIAM D. HUSTON
BY
Pollard Johnston Smythe & Robertson
ATTORNEYS

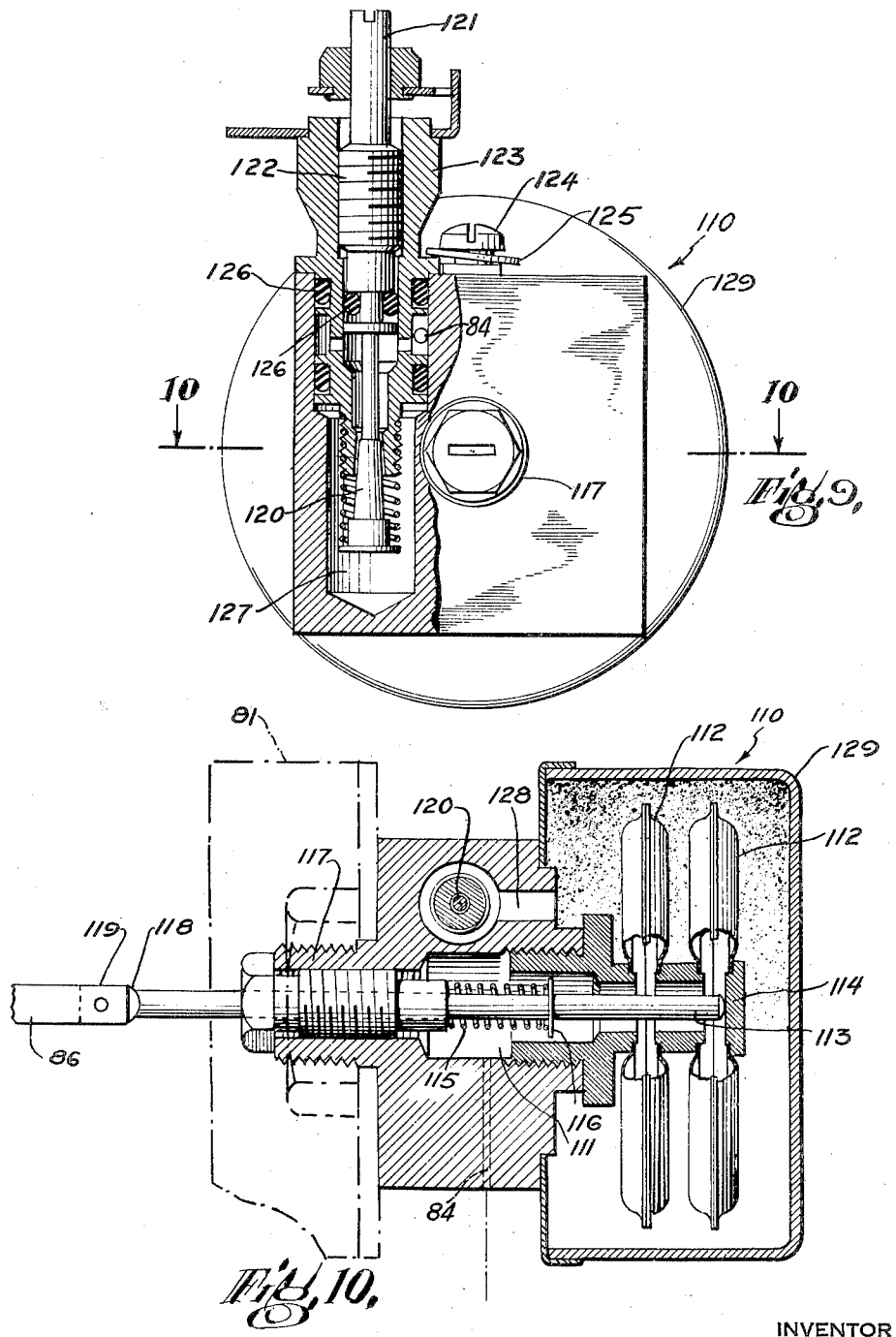

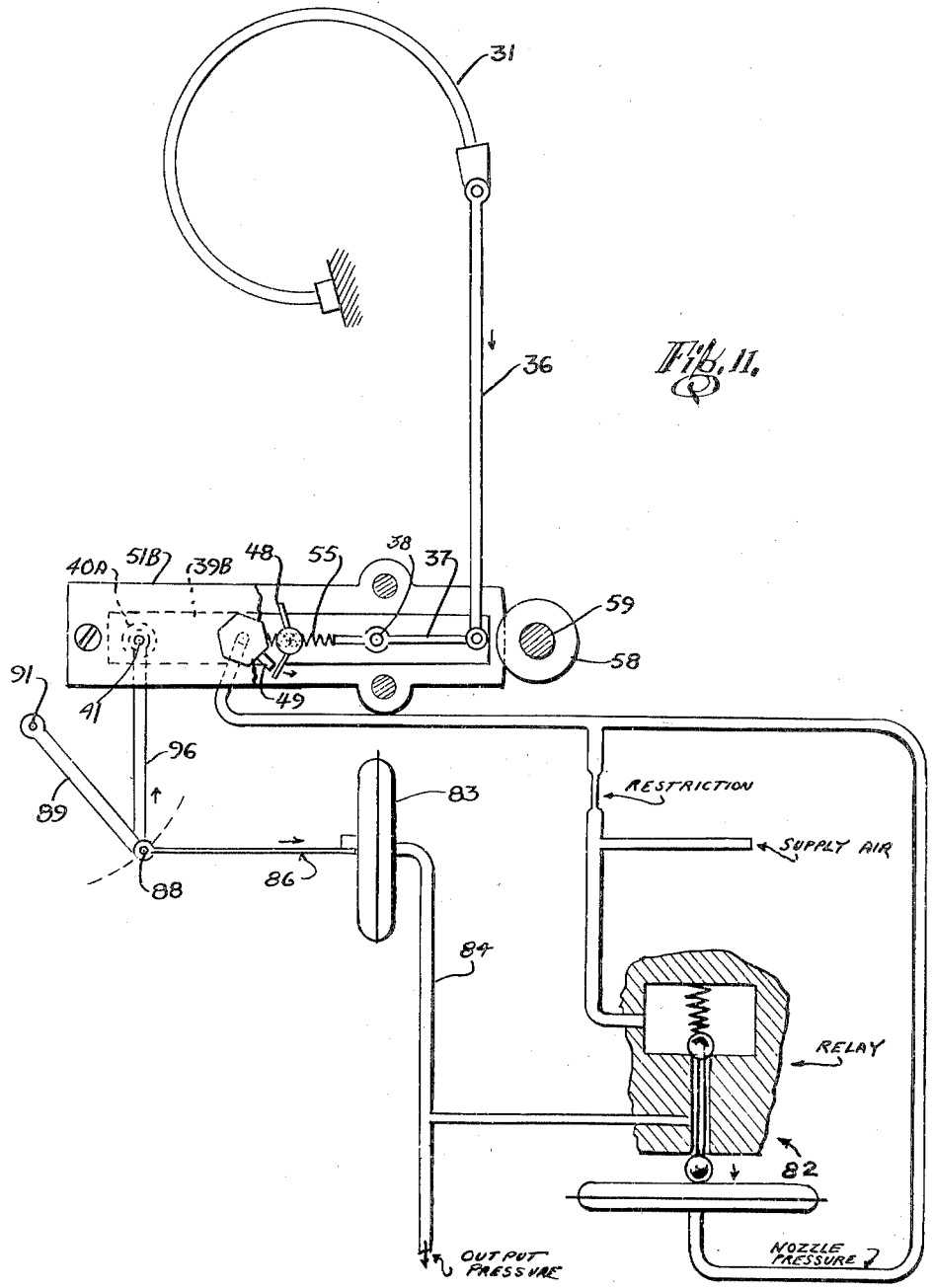

2,770,247

Patented Nov. 13, 1956

2,770,247

INSTRUMENTS

William D. Huston, Sellersville, Pa., assignor to American Machine and Metals, Inc., New York, N. Y., a corporation of Delaware Application September 15, 1954, Serial No. 456,261

15 Claims. (Cl. 137—85)

This invention relates to pneumatically operated instruments suitable for use in control arrangements and responsive to a measured variable.

It is known to employ a measuring variable, such as temperature, pressure, flow or the like to position a valve or flapper and nozzle relative to each other so as to vary the air pressure in the nozzle in accordance with the measured variable. The nozzle is connected to a supply of air through a restriction so that as the valve or flapper is moved to closed position relative to the nozzle by the measured variable or condition, air pressure in the nozzle will rise and vice versa. The controlled air pressure normally is used to operate a pressure relay. A follow-up or feedback means responsive to the output pressure can be connected to the nozzle or flapper in such a manner as to tend to return the flapper and nozzle to their original relative positions after having been moved in response to a change in the measured variable. Many of the previous devices have not been sufficiently sensitive or accurate and have been bulky and complicated in structure. Also, they have not been readily adaptable for varying uses.

One of the objects of this invention is to provide an improved instrument having high sensitivity and accuracy, the instrument being relatively small in size.

Another object of the invention is to provide a self-contained measuring and indicating arrangement.

A still further object of the invention is to provide a pneumatic control instrument arranged to receive any one of several feedback units or devices.

In one aspect of the invention, a measuring device such as a Bourdon tube or the like can be employed to operate an arm which controls the movement of a flapper relative to a nozzle. The measuring device could be in the form of bellows, wafers, bimetallic elements or similar devices. The Bourdon tube movement can take the form of a conventional gauge movement having mounted concentrically therewith a pointer to give an indication of the measured variable and can also have mounted concentrically therewith a second gauge movement with a set point indicator connected to the set mechanism, as will be described hereafter, "set point" being the value of the controlled variable which it is desired to maintain. The flapper is pivotally mounted on a differential carriage, the differential carriage in turn being mounted on an adjustable carrier. The differential carriage can be connected through an adjustable linkage proportional band arrangement to the feedback mechanism. The feedback mechanism may comprise a pressure responsive device responsive to the output pressure for moving the differential carriage in accordance with the output pressure. The proportioning band mechanism can be arranged so as to be set either in a direct or reverse position as needed and preferably is constructed so as to have a minimum of pivots.

In a further aspect of the invention the feedback or follow-up mechanism is mounted on a bracket in such a manner that the units, including reset units and other types of action, can be readily exchanged therefor, such being connected to the differential carriage through the mechanism. A "reset" response is a response whose rate of change is proportional to the deviation of the controlled variable.

In one form of the invention, a measured variable is connected to the flapper through a tightly wound elongated helical spring, as will be described at a later point.

These and other objects, advantages and features of the invention will become apparent from the following description and drawings.

Fig. 2 is a fragmentary perspective view from the front of the instrument illustrated in Fig. 1.

Fig. 3 is an enlarged view of the proportioning band adjustment arrangement.

Fig. 4 is similar to Fig. 3 with the exception that the proportioning band is shown in a different position.

Fig. 5 is an enlarged fragmentary view taken along the line 5—5 of Fig. 2.

Fig. 6 is an enlarged fragmentary view taken along the line 6—6 of Fig. 2.

Fig. 9 is an enlarged view taken in the direction 9—9 of Fig. 8.

Fig. 10 is an enlarged fragmentary view of the reset mechanism illustrated in Fig. 8, a portion thereof being in section.

Fig. 11 is a schematic view of one arrangement of the instrument.

Figures 1, 7:
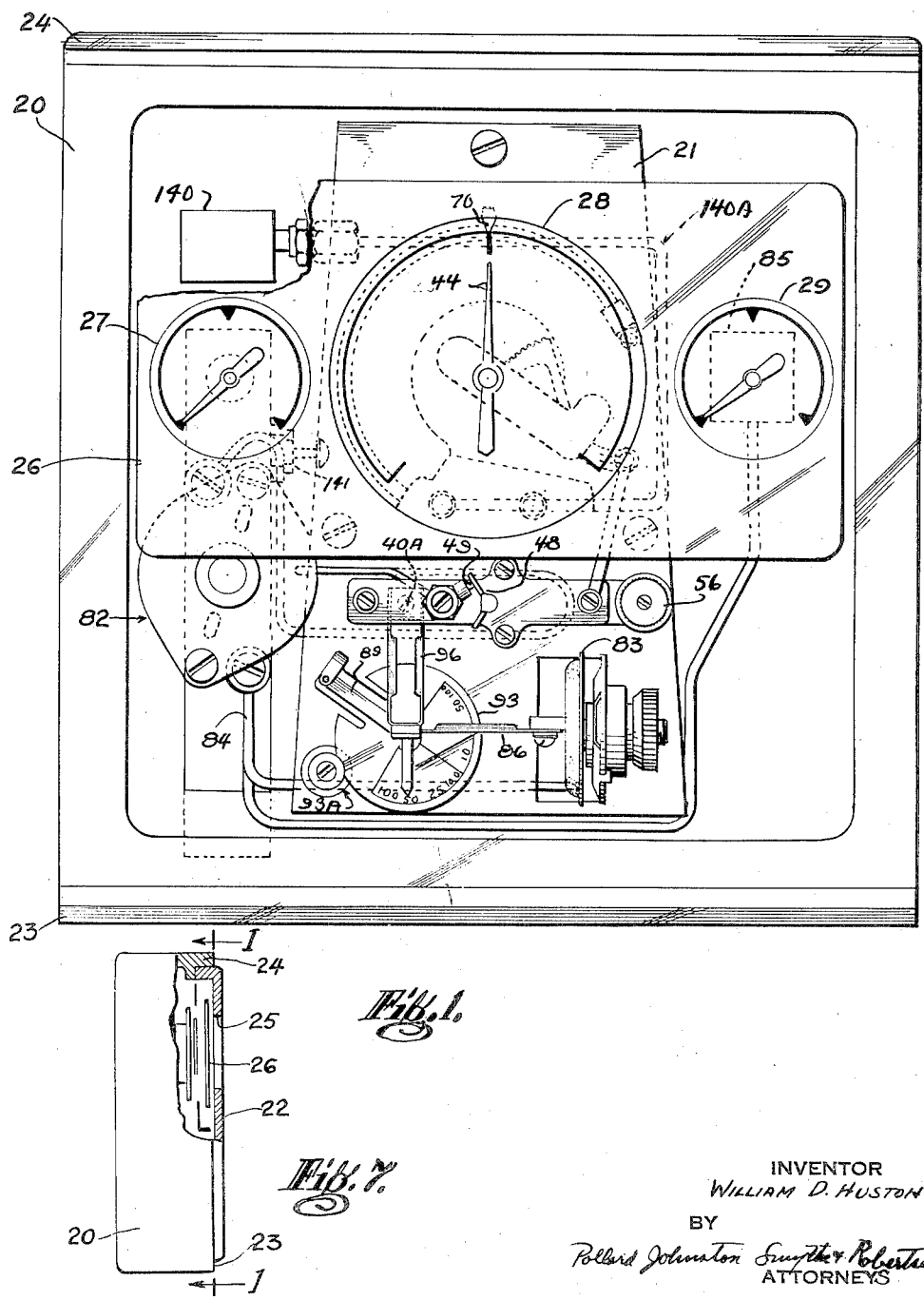
Fig. 1 is a front elevation of one arrangement of the instrument taken along the line 1—1 of Fig. 7, the door being omitted for clarity.
Fig. 7 is a reduced size side view of Fig. 1 with a portion thereof in section showing an arrangement of the door and shield.

A general description first will be given of the instrument, reference being made to Figs. 1 and 7. Casing 20 may serve as the frame to which various elements are secured. Mounting plate 21 can carry the measuring, indicating and pneumatic control elements or assembly, this plate being mounted on the inside back portion of casing 20. A door or cover 22 (Fig. 7, not shown in Fig. 1) can be pivotally mounted between projections 23, 24 of the casing. Cover 22 has an aperture 25 therein which may have a transparent material, such as glass through which the gauges can be read. Mounted on the cover 22 can be a shield 26, which has three apertures 27, 28, 29 for viewing the various gauges of the instrument. The shield 26 is shown in Fig. 1 in the position it will take when the cover is closed, the cover being omitted in Fig. 1.

First the measuring, indicating and pneumatic control assembly or portion of the instrument will be described, such being illustrated in detail in perspective in Fig. 2. Plate 21 can serve to carry the various elements thereof, which can include Bourdon tube socket 30 mounted on plate 21, Bourdon tube 31 having an end 32 thereof connected by link 33 with the tail or extension 34 of segment 35. Tail 34 also is connected through link 36 with lever 37, lever 37 being pivoted at 38 to the differential carriage 39. The differential carriage may comprise two plates 39A, 39B pivotally mounted on an axis 40. Plates 39A and 39B are held in spaced relation to each other by pivot means 38 and connecting block 41, the differential carriage 39 operating in a manner about to be described.

Sector 35 is connected to pinion 42, which in turn is connected to shaft 43 and indicating pointer 44, indicating pointer 44 serving to give an indication of the measured variable. The sector 35 and related parts are carried by the movement plates 45 mounted on plate 46, which is connected to or is a portion of socket 30.

Flapper actuating shaft 47 is rotatable about axis 40, flapper 48 being connected to said shaft and being rotatable therewith. It is to be noted that flapper or valve 48 has two extensions useable in accordance with the position of the nozzle, the nozzle being turnable to provide direct or reverse action. Nozzle 49 is mounted on block 50 which in turn is fastened to the adjustable carrier assembly 51, said adjustable carrier comprising plates 51A and 51B. The adjustable carrier is rotatable about axis 40 or screw 40A, the carrier plates 51A and 51B being held in spaced relationship by spacers 52, 53 and 54.

Movement of lever 37 rotates flapper shaft 47 through a spring 55, spring 55 being tightly wound in such a manner that it is preloaded so as to properly rotate the flapper until the flapper comes into contact with the nozzle. Thereafter, any movement will cause the spring to bend in such a manner as to change the spring rate thereof and decrease the same so that it will not affect operation of the instrument. It substantially acts as a solid up to a certain point and then upon bending exerts a relatively small resistance to further bending.

The set point of the instrument can be adjusted by means of rotation of the adjustable carrier 51 about an axis 40 or screw 40A, such being accomplished by turning of knob 56, said knob 56 turning disk 57 mounted thereon and disk 58 rotatable axially on shaft 59 of knob 56. The edge 60 of the adjustable carrier is interengaged by disks 57, 58, spring 61 urging disk 58 toward disk 57. This results in a friction engagement with the adjustable carrier 51 so that rotation of knob 56 will rotate carrier 51.

In order to indicate the set point, link 62 is connected at 63 to one of the carrier plates, the other end of said link being connected to tail 64 of segment 65 at 66. Segment 65 operates pinion 69 and through a suitable connecting shaft turns set point indicator 70. Sector 65 is carried by the movement plates 71, 72, the movement assembly being mounted on plate 45 of the indicating movement assembly. The set point pointer operating mechanism is seen to be a conventional gauge movement.

Describing operation up to this point, a change in measured variable will move link 36 and thus change the relationship of flapper 48 to nozzle 49 affecting the pressure in nozzle 49, as is known in the art. A change in pressure in 49 will result in a change in control or output pressure. The position of the nozzle 49 and flapper 48 relative to each other can be changed by rotation of adjustable carrier 51 by means of knob 56, which will result in adjustment of the set point of the instrument.

In the form shown in Fig. 2, a follow-up or feedback mechanism is illustrated at 80, said mechanism being mounted, for example, on bracket 81 carried on plate 21 or integral therewith.

The pressure in nozzle 49 is connected through the relay mechanism shown generally at 82 (Fig. 1) so as to control an output pressure for the purpose of operating a controller or other mechanism. The specific bar stock relay illustrated is described in copending application Serial No. 461,276, filed October 8, 1954.

The output pressure is fed to the follow-up bellows or wafer assembly through line 84 (Fig. 1), indicating gauge 85 also being connected to the output pressure so as to give an indication thereof. Movement of the bellows 83 is arranged so as normally to tend to return the flapper and nozzle to their original positions after they have been moved in response to a change in the measured variable. This may be accomplished through the mechanism acting upon the differential carriage 39.

Wafer assembly 83 has horizontal link 86 fastened thereto by means of a suitable fastening element such as screw 87. The end 88 of the horizontal link 86 is pivotally connected to arm 89 at 90, the other end of arm 89 being pivotally mounted at 91 to the extension 92 of disk 93, the axis of pivot 91 being arcuately adjustable about the center of disk 93.

When the parts are in the positions shown in Fig. 2 and Fig. 3, movement of link 86 in the direction of arrow 94 will cause end 88 to move in an arc and direction as illustrated by arrow 95, imparting a movement to connecting link 96 as shown by arrow 97. Connecting link 96 is fastened to block 41, which will cause a counterclockwise rotation of differential carriage 39 about flapper axis 40. Such will cause movement of pivot 38 in a direction as is desired in the feed back operation.

As disk 93 is rotated clockwise as illustrated in Fig. 4 so as to move pivot 91 closer to vertical line 98 (Fig. 3), there will be less movement of connecting link 96 for a corresponding movement of horizontal link 86. For example, if it is at 91A, there will be substantially no movement of 96. If the disk 93 be rotated sufficiently so that it is to the right of the vertical line 98, the effect of movement thereof will be the reverse of that shown in Figs. 3 and 4 so as to adapt the instrument for use in accordance with the arrangement thereof.

As can be seen in Fig. 6, one form of connection with lever 89 can be by means of a ball joint 99, although it is to be understood that other types of connections may be used. The pivot connection at 90 is arranged to be supported by the link 96 with a minimum of pivots and with desired rigidity.

It is to be noted that by opening the cover and removing a few connections, the instrument assembly carried on plate 21 may be removed or the relay portion be removed, all of these parts being accessible from the front of the casing.

Figure 8:
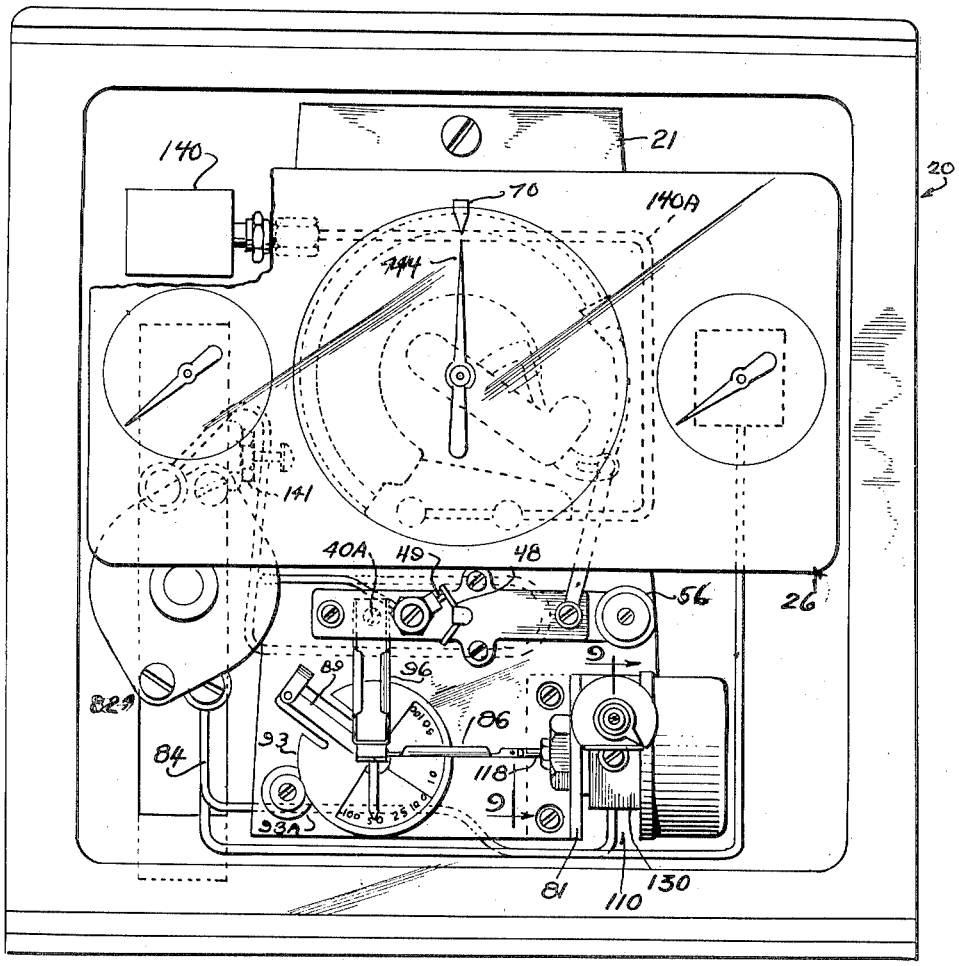
Fig. 8 is a view similar to Fig. 1 with the exception that a reset mechanism is illustrated in the combination.

In some instances, it is desirable to provide what is known as reset action in the operation of the instrument. If such a feature is to be used, the feed back apparatus 80 seen in Fig. 2 can be replaced by the reset assembly 110 illustrated in Fig. 8, such being mounted on bracket 81 fastened to plate 21, parts in Fig. 8 which are identical to those in Fig. 1 being given the same reference characters.

In a reset mechanism, the feedback arrangement proportioning band control is combined with a reset action.

As can be seen in Fig. 10, the output pressure is fed through a channel (not shown) to chamber 111 and thence to the interior of the wafer 112, said wafer having feeler 113 urged into engagement with plate 114 by spring 115 and abutment 116 connected to feeler 113.

Feeler 113 extends through gland or guide 117 to the exterior of the casing so that end 118 thereof can be connected at 119 to horizontal link 86. Thus, the interior of the wafer assembly 112 is subjected to feedback pressure. The reset action is obtained through a needle valve or restriction which is controlled by shaft 121 screw threadedly engaged at 122 with the holder 123, said holder 123 being held in place by screw 124 and washer 125, suitable O-ring seals 126 being provided as needed.

Air is fed from chamber 127 through 128 to the interior of casing 129 which will operate on the exterior of the wafers 112 with reset action due to the needle valve arrangement 120 or controlled aperture.

Fig. 11 illustrates schematically one manner in which the various parts of the invention can be connected, the parts being given the appropriate numbers of Figs. 1 and 2. Nozzle 49 is shown in its lower position and the disk 93 is shown to the left of link 96.

Proportioning band adjusting means 93A may have a construction similar to that described for the carrier adjustment controlled by knob 56 for frictionally engaging disk 93.

The measured variable connecting block 140 mounted on the back of the casing may be connected by a suitable line 140A with the Bourdon tube or other measuring device. A restriction controlling means 141 (Figs. 1 and 8) can be provided in the base of the relay 82 for the purpose of restricting the flow of supply air to the nozzle as is known in the art.

Many parts of the instrument concerned herewith are designed and made so that they can be readily stamped from flat pieces of metal and thus facilitate construction of the device. Also, the measuring and pneumatic control assembly can be calibrated before assembly with the case. The back of the shield 26 may have indicia (not shown) and instructions placed thereon if desired so as to facilitate adjustment and operation. The proportioning band adjustment arrangement, including the links thereon, are arranged so that they can be readily supported at a minimum number of pivots, which will serve to reduce the friction in this part of the mechanism.

It should be apparent that various details of construction can be changed without departing from the spirit of the invention except as defined in the appended claims.

What is claimed is:

1. In a pneumatic control apparatus having a nozzle device and a flapper device, said devices being movable relative to each other to control output pressure, the combination including condition responsive means, a differential carriage oscillatable about an axis, device operating means pivotally mounted on said carriage and connected to said condition responsive means for operation thereby, the pivot of said device operating means being spaced from the axis of said carriage, one of said devices being rotatable about the axis of said carriage, an adjustable carrier pivotally mounted on an axis, the other of said devices being mounted on said carrier so that said devices can be moved relative to each other, and output pressure responsive means connected to said carriage.

2. In a pneumatic control apparatus having a nozzle device and a flapper device, said devices being movable relative to each other to control output pressure, the combination including condition responsive means, a differential carriage oscillatable about an axis, device operating means pivotally mounted on said carriage and connected to said condition responsive means for operation thereby, the pivot of said device operating means being spaced from the axis of said carriage, one of said devices being rotatable about the axis of said carriage, an adjustable carrier pivotally mounted on an axis, the other of said devices being mounted on said carrier so that said devices can be moved relative to each other, output pressure responsive means, and adjustable proportional band linkage means connecting said output pressure means and said carriage.

3. In a pneumatic control apparatus having a nozzle device and a flapper device, said devices being movable relative to each other to control an output pressure, the combination including a measured variable responsive means, a differential carriage oscillatable about an axis, device operating means pivotally mounted on said carriage and connected to said variable responsive means, the pivot of said device operating means being spaced from the axis of said carriage, said device operating means including a preloaded spring, one of said devices being rotatable about the axis of said carriage, an adjustable carrier pivotally mounted on an axis, the other of said devices being mounted on said carrier so that said devices can be moved relative to each other, and output pressure responsive means connected to said carriage.

4. In a pneumatic control apparatus having a nozzle device and a flapper device, said devices being movable relative to each other to control an output pressure, the combination including a measured variable responsive means, a differential carriage oscillatable about an axis, flapper operating means pivotally mounted on said carriage and connected to said variable responsive means, the pivot of said flapper operating means being spaced from the axis of said carriage, said flapper operating means including a preloaded spring connecting said device operating means and one of said devices, said flapper device being rotatable about the axis of said carriage, an adjustable carrier pivotally mounted on an axis, the other of said devices being mounted on said carrier, so that said devices can be moved relative to each other, and output pressure responsive means connected to said carriage.

5. In a pneumatic control apparatus having a nozzle device and a flapper device, said devices being movable relative to each other to control an output pressure, the combination including a measured variable responsive means, a differential carriage oscillatable about an axis, flapper operating means pivotally mounted on said carriage and connected to said variable responsive means, the pivot of said flapper operating means being spaced from the axis of said carriage, said flapper operating means including a preloaded spring connecting said device operating means and one of said devices, said flapper device being rotatable about the axis of said carriage, an adjustable carrier pivotally mounted on an axis, said nozzle device being mounted on said carrier so that said devices can be moved relative to each other, output pressure responsive means, and an adjustable linkage arrangement connecting said output pressure responsive means and said carriage.

6. In a pneumatic control apparatus having a frame, a nozzle and a flapper, said nozzle and flapper being movable relative to each other in response to change in a variable to control output pressure, the combination including a variable responsive means, a differential carriage oscillatable about an axis, said carriage comprising a pair of spaced plates, flapper operating means pivotally mounted on said carriage between said plates and connected to said variable responsive means, the pivot of said operating means being spaced from the axis of said carriage, said flapper being rotatable about the axis of said carriage, an adjustable carrier pivotally mounted on an axis, said carrier comprising a pair of spaced plates between which said carriage is located, said nozzle being mounted on said carrier whereby said nozzle and flapper can be moved relative to each other, output pressure responsive means mounted on said frame, and adjustable proportional band linkage means connecting said output pressure means and said carriage.

7. In a pneumatic control apparatus having a nozzle device and a flapper device, said devices being movable relative to each other to control output pressure, the combination including a measured variable condition responsive means, an indicating pointer driven by said responsive means, a differential carriage oscillatable about an axis, device operating means pivotally mounted on said carriage and connected to said variable responsive means, the pivot of said device operating means being spaced from the axis of said carriage, an adjustable carrier pivotally mounted on an axis, the other of said devices being mounted on said carrier so that said devices may be moved relative to each other, and a set point indicator connected to said carrier.

8. In a pneumatic control apparatus having a nozzle device and a flapper device, said devices being movable relative to each other to control output pressure, the combination including a Bourdon tube measured variable condition responsive means, an indicating pointer driven by said responsive means through a sector and pinion shaft, a differential carriage oscillatable about an axis, device operating means pivotally mounted on said carriage and connected to said variable responsive means, the pivot of said device operating means being spaced from the axis of said carriage, an adjustable carrier pivotally mounted on an axis, the other of said devices being mounted on said carrier so that said devices can be moved relative to each other, and a set point indicator connected to said carrier, said set point indicator being driven through a sector and pinion, said pinion being concentric with the pionion of said indicating pointer.

9. In a pneumatic control apparatus having a nozzle device and a flapper device, said devices being movable relative to each other to control output pressure, the combination including condition responsive means, a differential carriage oscillatable about an axis, device operating means pivotally mounted on said carriage and connected to said condition responsive means, the pivot of said device operating means being spaced from the axis of said carriage, one of said devices being rotatable about the axis of said carriage, an adjustable carrier pivotally mounted on an axis, the other of said devices being mounted on said carrier so that said devices can be moved relative to each other, output pressure responsive means, and adjustable proportional band linkage means connecting said output pressure means and said carriage, said proportioning band linkage means including a first link connected to said carriage, a second link connected to said output pressure means, said first and second links being pivotally connected together, a third link having one end pivotally mounted on an arcuately adjustable pivot, said third link pivotally supporting said first and second links so that direction and extent of movement of said carrier in response to movement of said output pressure means can be changed by adjustment of said arcuately adjustable pivot.

10. In a pneumatic control apparatus having nozzle and flapper devices and a feedback means, an adjustable linkage connecting one of said devices with said feedback means including a first link connected to said feedback means and movable thereby, a boxspring like second link connected to said first link and to one of said devices, and a third link having one end pivotally mounted on an arcuately adjustable support and its other end pivotally supporting the connection of said first and second links.

11. In a pneumatic controller arrangement having flapper and nozzle devices and feedback means, the combination including a differential carriage composed of substantially parallel side plates, a pivoted lever mounted on said carriage and movable in accordance with a measured variable to operate one of said devices relative to the other, a hanging transfer link positioned in a plane parallel to said carriage plates and connected thereto, and a second link connected to said transfer link and to said feedback means whereby said links are free of pivot supports.

12. In a pneumatic controller arrangement having flapper and nozzle devices and feedback means, the combination including a differential carriage composed of substantially parallel side plates, a pivoted lever mounted on said carriage and movable in accordance with a measured variable to operate one of said devices relative to the other, a hanging transfer link positioned in a plane parallel to said carriage plates and connected thereto, a second link connected to said transfer link and to said feedback means whereby said links are free of pivot supports, and a third link pivotally supporting the connection between said transfer link and second link.

13. In a feedback means for a pneumatic control apparatus, the combination including a block mountable on a bracket on said apparatus, said block having an aperture therein connected with a chamber, means for connecting said aperture to the output pressure of said apparatus, a bellows assembly mounted on said block and having its interior connected to said chamber for receiving output pressure from said control apparatus, a cover enclosing said assembly, a passage connecting said aperture with the space between said cover and assembly, and a readily removable adjustable restriction valve in said aperture between said space and the output pressure for restrictively connecting output pressure to the exterior of said assembly so as to provide reset response.

14. In a pneumatic control apparatus having a nozzle device and a flapper device, said devices being movable relative to each other to control output pressure, the combination including condition responsive means, a differential carriage oscillatable about an axis, device operating means pivotally mounted on said carriage, the pivot of said device operating means being spaced from the axis of said carriage and responsive to said condition responsive means, one of said devices being rotatable about the axis of said carriage, and an adjustable carrier, the other of said devices being mounted on said carrier.

15. In a pneumatic control apparatus having nozzle and flapper devices and a feedback means, an adjustable linkage connecting one of said devices with said feedback means including a first link connected to said feedback means and movable thereby, a box spring like second link connected to said first link and to one of said devices, and a third link having one end pivotally mounted on an arcuately adjustable support and its other end pivotally supporting the connection of said first and second links.

References Cited in the file of this patent

UNITED STATES PATENTS

| | | |
|---|---|---|
| 2,297,361 | Mallory | Sept. 29, 1942 |
| 2,443,891 | Buerschaper | June 22, 1948 |
| 2,518,674 | Fischer | Aug. 15, 1950 |
| 2,536,198 | Matner | Jan. 2, 1951 |
| 2,593,129 | Fischer | Apr. 15, 1952 |
| 2,623,392 | Howe | Dec. 30, 1952 |
| 2,631,570 | Bowditch | Mar. 17, 1953 |